(12) United States Patent  (10) Patent No.: US 9,319,157 B2
Alexander et al.  (45) Date of Patent: Apr. 19, 2016

(54) CHARACTERISATION OF A WIRELESS COMMUNICATIONS LINK

(75) Inventors: Paul Dean Alexander, Crafers (AU); David Victor Lawrie Haley, Stepney (AU)

(73) Assignee: Cohda Wireless Pty. Ltd. (AU)

( * ) Notice: Subject to any disclaimer, the term of this patent is extended or adjusted under 35 U.S.C. 154(b) by 0 days.

(21) Appl. No.: 13/379,318

(22) PCT Filed: Jun. 18, 2010

(86) PCT No.: PCT/AU2010/000762
§ 371 (c)(1),
(2), (4) Date: May 17, 2012

(87) PCT Pub. No.: WO2010/144970
PCT Pub. Date: Dec. 23, 2010

(65) Prior Publication Data
US 2012/0225665 A1    Sep. 6, 2012

(30) Foreign Application Priority Data
Jun. 19, 2009  (AU) .................................. 2009902847

(51) Int. Cl.
*H04B 17/309* (2015.01)
*H04W 52/24* (2009.01)
(Continued)

(52) U.S. Cl.
CPC ............ *H04B 17/309* (2015.01); *H04B 17/104* (2015.01); *H04B 17/391* (2015.01); *H04W 52/242* (2013.01); *H04B 17/27* (2015.01)

(58) Field of Classification Search
CPC ......... H04W 64/00; H04W 4/02; H04W 4/04; H04W 52/245; H04W 24/02; H04W 24/08; H04W 52/242; H04W 16/00; G01S 5/0252; G01S 5/14; G01S 5/021; G01S 5/02; G01S 5/0221; G01S 11/06; G01S 5/0215; G01S 5/0273; G01S 19/22; H04B 17/309; H04B 17/104; H04B 17/391; H04B 17/27
USPC ....................................... 455/446, 456.1–456.6
See application file for complete search history.

(56) References Cited

U.S. PATENT DOCUMENTS 6,477,376 B1   11/2002   Carter
7,020,461 B2    3/2006   Okanoue et al.
(Continued)

FOREIGN PATENT DOCUMENTS

GB     2445385 A      7/2008
JP     2002-204199 A  7/2002
(Continued)

OTHER PUBLICATIONS

"International Application No. PCT/AU2010/000762, International Search Report and Written Opinion mailed Aug. 23, 2010", (Aug. 23, 2010), 9 pgs.

(Continued)

*Primary Examiner* — Magdi Elhag
(74) *Attorney, Agent, or Firm* — Schwegman, Lundberg & Woessner, P.A.

(57) ABSTRACT

A system and method are described for characterizing a wireless communications link as line-of-sight (LOS) or non line-of-sight (NLOS). The method comprises receiving data (T) representing a position of a transmitter, receiving data (R) representing a position of a receiver, receiving a measure of transmitted power at an output of the transmitter (PT) and receiving a measure of received power at an input to the receiver (PR). An NLOS detector (400) generates at least one non line-of-sight metric to characterize the wireless link between the transmitter and the receiver based on the position of the receiver, the position of the transmitter, the transmitted power and the received power.

23 Claims, 3 Drawing Sheets

(51) Int. Cl.
*H04B 17/10* (2015.01)
*H04B 17/391* (2015.01)
*H04B 17/27* (2015.01)

(56) References Cited

U.S. PATENT DOCUMENTS

| | | | |
|---|---|---|---|
| 7,177,651 B1* | 2/2007 | Almassy | 455/456.1 |
| 7,583,976 B2 | 9/2009 | Batra et al. | |
| 2001/0041565 A1* | 11/2001 | Vicharelli et al. | 455/423 |
| 2002/0002046 A1* | 1/2002 | Okanoue et al. | 455/423 |
| 2004/0189447 A1* | 9/2004 | Okubo et al. | 340/425.5 |
| 2006/0069526 A1* | 3/2006 | Kaiser et al. | 702/150 |
| 2007/0139269 A1* | 6/2007 | Chen et al. | 342/450 |
| 2008/0198948 A1* | 8/2008 | Tang | 375/316 |
| 2009/0128412 A1* | 5/2009 | Ryu et al. | 342/463 |
| 2010/0120370 A1* | 5/2010 | Ishii | 455/67.11 |
| 2014/0329520 A1* | 11/2014 | Militano | H04W 24/02 455/422.1 |

FOREIGN PATENT DOCUMENTS

| | | |
|---|---|---|
| JP | 2009-064329 A | 3/2009 |
| WO | WO-2010/144970 A1 | 12/2010 |

OTHER PUBLICATIONS

Anderson, Jorgen Bach, et al., "Propagation Measurements and Models for Wireless Communications Channels", IEEE Commun. Mag., Jan. 1995, vol. 33, No. 1, (Jan. 1995), 42-49.

Atefi, A., et al., "Urban Radio Propagation in Mobile Radio Frequency Bands", Tech. Comm., Birmingham IEE Conference Publication, No. 262, (May 1986), 13-18.

Baum, Daniel S., et al., "An Interim Channel Model for Beyond-3G Systems", IST Project IST-2003-507581 Winner, IEEE, (Sep. 2005), 5 pgs.

Maciel, Leandro R., et al., "Cell Shape for Microcellular Systems in Residential and Commercial Environments", IEEE Transactions on Vehicular Technology, vol. 43, No. 2, (May 1994), 9 pgs.

Wiart, Joe, "Micro-Cellular Modelling When Base Station Antenna is Below Roof Tops", Institute of Electrical and Electronics Engineers, IEEE Vehicular Technology Conference, 1994, (1994), 200-204.

"Chinese Application No. 201080036973.0, First Office Action issued Apr. 3, 2014", (Apr. 3, 2014), 17 pgs.

"Japanese Application No. 2012-515291, Notice of Reasons for Rejection dated Feb. 21, 2014", (Feb. 21, 2014), 14 pgs.

Ito, Toshio, et al., "An Experimental Study on Characteristics of Arrival Direction in 5-GHz Band Non-Line-of-Sight FWA Systems", IEICE Tech. Rep., vol. 107, No. 305, AP2007-110, pp. 47-52, Nov. 2007, (Nov. 1, 2007), 9 pgs.

Otsuka, Masashi, et al., "Radio Propagation Characteristics for Inter-VehicleCommunication on 2.4 GHz ISM Band: Comparison Between LOS and NLOS Propagation", The Institute of Electronics, Information and Communication Engineers, Technical Report of IEICE, SST 99(704), 21-26, Mar. 17, 2000, (Mar. 17, 2000), 9 pgs.

"Australian Application Serial No. 2010262765, Examination Report mailed Mar. 18, 2014", 4 pgs.

"Chinese Application No. 201080036973.0, Response filed Jul. 17, 2014 to First Office Action issued Apr. 3, 2014", (w/ English Translation of Claims), 19 pgs.

"Chinese Application No. 201080036973.0, Second Office Action mailed Nov. 3, 2014", (w/ English Translation), 17 pgs.

"International Application No. PCT/AU2010/000762, International Preliminary Report on Patentability dated Dec. 20, 2011", 6 pgs.

"Japanese Application No. 2012-515291, Response filed Sep. 4, 2014 to Notice of Reasons for Rejection dated Feb. 21, 2014", 20 pgs.

"Japanese Application Serial No. 2012-515291, Office Action mailed Sep. 30, 2014", (w/ English Translation), 11 pgs.

"European Application Serial No. 10788515.4, Supplementary European Search Report mailed Jan. 27, 2015", 6 pgs.

"Australian Application Serial No. 2010262765, Examination Report mailed Dec. 11, 2015", 5 pgs.

Al-Jazzar, S., et al., "New algorithms for NLOS Identification", *IST Mobile and Wireless Communications Summit*, (2005), 1-5.

Karp, B., et al., "GPSR: Greedy Perimeter Stateless Routing for Wireless Networks", *MobiCom* 2000, (2000), 12 pgs.

Yu, K., et al., "Statistical NLOS Identification Based on AOA, TOA, and Signa Strength", *IEEE Transactions on Vehicular Technology*, 58(1), (Jan. 2009), 274-286.

\* cited by examiner

# CHARACTERISATION OF A WIRELESS COMMUNICATIONS LINK

PRIORITY CLAIM TO RELATED APPLICATIONS

This application is a national stage application under 35 U.S.C. §371 of PCT/AU2010/000762, filed Jun. 18, 2010, and published as WO 2010/144970 A1 on Dec. 23, 2010, which claims priority to Australian Application No. 2009902847, filed Jun. 19, 2009, which applications and publication are incorporated herein by reference and made a part hereof in their entirety, and the benefit of priority of each of which is claimed herein.

FIELD OF THE INVENTION

The present invention relates to the field of wireless communications. In particular the present invention relates to the characterisation of a wireless communications link as either line-of-sight (LOS) or non line-of-sight (NLOS).

BACKGROUND OF THE INVENTION

Wireless communication systems may be represented in terms of a transmitter 100 and receiver 104, separated by a channel 102, as shown in FIG. 1. The transmitter transforms the data into a signal suitable for transmission over the channel. For the purposes of determining the transmitted data, the goal of the receiver 104 is to remove the effects of the channel distortions from the signal and to obtain an estimate of the data. The receiver 104 may also provide parameters pertaining to the received signal, such as a measure of received power.

The channel 102 represents the effects induced by the environment surrounding the wireless communications system. The channel 102 may distort the transmitted signal in some way. Channel distortions may include amplitude distortions, frequency offsets, phase offsets, Doppler effects, distortions resulting from multipath channels, additive noise or interference.

Spatial parameters pertaining to the transmitter 102 and/or receiver 104 devices may be known. Such parameters may include spatial coordinates, velocity, and acceleration. For example, the devices may be positioned at known fixed locations. Spatial parameters may also be obtained from a Global Positioning System (GPS) receiver or similar device. Furthermore, spatial information relating to the transmitter 102 may be passed to the receiver 104 within the transmitted data content. An example of such a case occurs in Dedicated Short Range Communications (DSRC) systems, where transmitted data may include position, speed, acceleration and heading information, as described in SAE International, "Dedicated Short Range Communications (DSRC) Message Set Dictionary," J2735, December 2006.

Reference to any prior art in the specification is not, and should not be taken as, an acknowledgement or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

The present invention provides methods for characterisation of a wireless communications link, by processing information pertaining to system components and information extracted from the received waveform. The wireless communications link may be characterised as a line-of-sight (LOS) or non-line-of-sight (NLOS) link.

In one aspect of the invention transmitters include their state in the messages they transmit. At the receiver the messages are recovered and form part of the receiver's view of the transmitter state.

In another aspect of the invention there is provided a method for characterising a wireless communications link, comprising:
receiving data representing a position of a transmitter;
receiving data representing a position of a receiver;
receiving a measure of transmitted power at an output of the transmitter;
receiving a measure of received power at an input to the receiver;
generating at least one non line-of-sight metric to characterise the wireless link between the transmitter and the receiver based on the position of the receiver, the position of the transmitter, the transmitted power and the received power; and
outputting the non line-of-sight metric to characterise the wireless communications link.

In another aspect of the invention, a system is provided for characterising a wireless communications link, comprising:
an input operable to receive a point in space representing the position of the transmitter;
an input operable to receive a point in space representing the position of the receiver;
an input operable to receive a measure of transmitted power at the output of the transmit antenna;
an input operable to receive a measure of received power at the input to the receive antenna;
an non line-of-sight (NLOS) detector operable to generate at least one non line-of-sight metric for the wireless link based on the inputs; and
an output for providing the non line-of-sight metric.

According to a another aspect of the invention said non line-of-sight detector includes a transmitter-to-receiver distance calculator which calculates and outputs the distance between the transmitter and the receiver, using said position of the transmitter and position of the receiver inputs.

According to a further aspect of the invention said non line-of-sight detector includes an observed path loss calculator which calculates and outputs an observed path loss, using said measure of transmitted power and measure of received power inputs.

According to another aspect of the invention said non line-of-sight detector includes a modelled path loss calculator which determines a modelled path loss, according to a model using the transmitter-to-receiver distance as input.

In another aspect of the invention said path loss model is adjusted depending on environmental conditions.

In another aspect of the invention said position of the transmitter and/or receiver input are provided by a fixed location, communication to the non line-of-sight detector; a global positioning system (GPS), stored data, and/or inclusion in data transmitted to the receiver.

In another aspect of the invention said measure of transmitted power input is provided by a fixed level, communication to the non line-of-sight detector, a measure relative to some stage of the transmitter prior to the transmit antenna, stored data, inclusion in data transmitted to the receiver, and/ or an estimate.

In another aspect of the invention said measure of received power input is provided by at least one of, output from the receiver, a measure relative to receiver input or some stage prior to the receiver input, and/or stored data.

In another aspect of the invention at least one parameter used to calculate said measure of transmitted power input and/or said measure of received power input is provided to the non line-of-sight detector, or a value for such a parameter is assumed.

In another aspect of the invention said non line-of-sight detector includes a non line-of-sight metric generator which uses a measured path loss input and a modelled path loss input to generate and output at least one non line-of-sight metric, e.g. where said output is the difference between the two path loss inputs.

In another aspect of the invention the non line-of-sight metric generator maps the difference between the two path loss inputs onto another value prior to output.

In another aspect of the invention said non line-of-sight metric generator bypasses said measured and modelled path loss calculators according to the value of said transmitter-to-receiver distance input.

The non line-of-sight metric generator may map the path loss difference to a non line-of-sight metric value prior to output.

The mapping may comprise at least one of:
said path loss difference mapped onto said non line-of-sight metric according to some predetermined function;
said path loss difference mapped onto a predetermined said non line-of-sight metric assigned to said path loss difference value;
said path loss difference and said transmitter-to-receiver distance mapped onto said non line-of-sight metric according to some predetermined function;
said path loss difference and said transmitter-to-receiver distance mapped onto a predetermined said non line-of-sight metric assigned to that combination of said path loss difference and said transmitter-to-receiver distance;
a function that quantizes said path loss difference; and
a function that quantizes said transmitter-to-receiver distance.

The map may have an input space segmented into bins.

Each bin may be defined by predetermined lower boundary and upper boundary, and said output metric values are assigned to each bin.

The non line-of-sight metric generator may determine bin membership for said path loss difference input, such that said path loss difference lies between said lower and upper bin boundaries, and then outputs said metric value assigned to said bin membership.

The bin segmentation may comprise at least one of:
two bins, with boundary between bins selected such that it demarcates the expected value of said path loss difference input as either line-of-sight (LOS) or non line-of-sight; and
three bins, with boundary between first and second bins selected such that it demarcates the expected value of said path loss difference input as either line-of-sight or unknown, and boundary between second and third bins selected such that it demarcates the expected value of said path loss difference input as either unknown or non line-of-sight.

The non line-of-sight metric generator may bypass said measured and modelled path loss calculators according to the value of said transmitter-to-receiver distance input.

The bypass may occur when:
said transmitter-to-receiver distance is above some threshold value;
said transmitter-to-receiver distance is below some threshold value;

During said bypass said non line-of-sight metric generator output may comprise at least one of:
a fixed value metric;
a metric value calculated according to some function of said transmitter-to-receiver distance.

The receiver may have two or more receive antennas.

The observed path loss is calculated for each receive antenna.

The transmitter-to-receiver distance calculation may comprise at least one of:
a calculation for each receive antenna where per-antenna position information is available;
a value considered equivalent across antennas.

The non line-of-sight metric generator may use at least one metric calculated from at least one antenna to output at least one of:
a per-antenna metric value;
maximum per-antenna metric value;
minimum per-antenna metric value;
average per-antenna metric value, taken across all receive antennas;
average per-antenna metric value, taken across a subset of receive antennas; and
a statistic relating to the per-antenna metric values;

The non line-of-sight detector may make an estimate of the power at the output of the transmit antenna and uses this to represent said measure of transmitted power at the output of the transmit antenna input.

An expected loss may be calculated according to some model when said transmitter-to-receiver distance is below some value, and then said expected loss is summed with said measure of received power at the input to the receive antenna to produce said estimate of the power at the output of the transmit antenna.

The model may be some base loss at a distance with an additional loss per distance decade.

The non line-of-sight metric generator may record a said estimate of the power at the output of the transmit antenna for the specific transmitter and uses it to characterise the link for further signals received from the same transmitter, assuming power at the output of the transmit antenna equal to said estimate of the power at the output of the transmit antenna.

The non line-of-sight metric generator combines said metrics derived from said inputs received during some time window.

The combination may be performed by filtering metrics over the time window according to some function.

The filter function may be at least one of:
Performing a block average of metrics over the time window;
Performing an auto-regression of metrics over the time window; and
Combining a time-based selection of samples from the window.

The non line-of-sight detector is employed to provide input into at least one connected system.

The connected system may be at least one of:
a vehicular system;
a road side system; and
a safety system.

Information received by said non line-of-sight detector may be used for at least one of:
providing an alert when detecting a potential collision threat;
modifying the nature of an alert;

modifying the trigger of an alert;
reducing the likelihood of false alerts.

The non line-of-sight detector output may be used for altering map information via at least one of:
detecting erroneous map information;
correcting erroneous map information; and
augmenting existing map information.

The map alterations may be provided to a central body responsible for reviewing the map data and distributing updates.

The non line-of-sight detector may be run online as inputs become available.

The non line-of-sight detector may be run offline, post processing input data that was collected prior to its execution.

The wireless communications link may be IEEE 802.11 compliant.

In yet another aspect of the invention method said receiver has two or more receive antennas.

In another aspect of the invention said non line-of-sight metric generator combines said metrics derived from said inputs received during some time window.

In another aspect of the invention said non line-of-sight detector may be run online as inputs become available, or run offline by post processing input data that was collected prior to its execution.

Functional uses for outputs of the environment estimator are also described.

BRIEF DESCRIPTION OF THE DRAWINGS

Embodiments of the present invention will now be described with reference to the drawings, in which.

DETAILED DESCRIPTION OF THE EMBODIMENTS

Embodiments of a non line-of-sight detector are described that allows characterisation of a wireless communications link as either line-of-sight (LOS) or non line-of-sight (NLOS), by processing information pertaining to system components and information extracted from the received waveform.

The described techniques have potential application to wireless communications systems, e.g. DVB-T, DVB-H, IEEE 802.11, IEEE 802.16, 3GPP2, Dedicated Short Range Communications (DSRC), Communications Access for Land Mobiles (CALM), and proprietary systems.

In a wireless communications link, a signal is transmitted from transmitter (Tx) 100 to receiver (Rx) 104. The presence of objects in the environment surrounding the transmitter 100 and receiver 104 may lead to multiple paths arriving at the receiver. The transmitted signal may be inflected by objects in the environment, e.g. through reflection or diffraction. Examples of inflectors include vehicles, signs, buildings or other structures within the environment.

Figure 1:
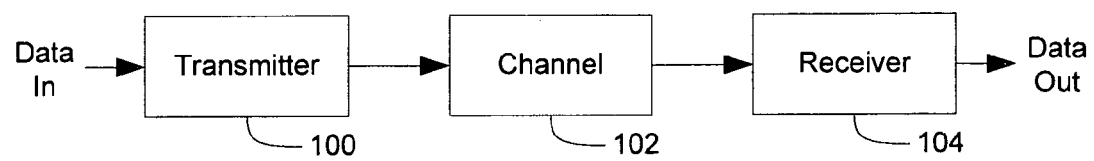
FIG. 1: is a schematic drawing of a communications system.
Figure 2:
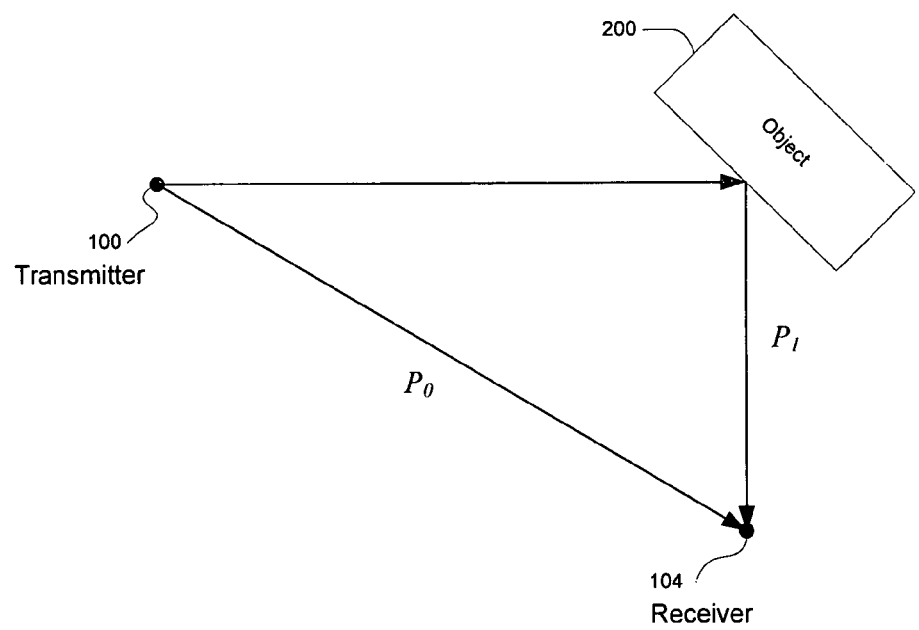
FIG. 2: is an example of a line-of-sight link.

A wireless communications link is categorised as LOS if it includes a direct line-of-sight path between transmitter 100 and receiver 104. FIG. 2 shows an example of a LOS link. The transmitted signal arrives at the receiver 104 via two paths. Path P0 is a direct line-of-sight path between transmitter 100 and receiver 104, making this a LOS link. Path P1 arrives at and receiver after being reflected off an object 200.

Figure 3:
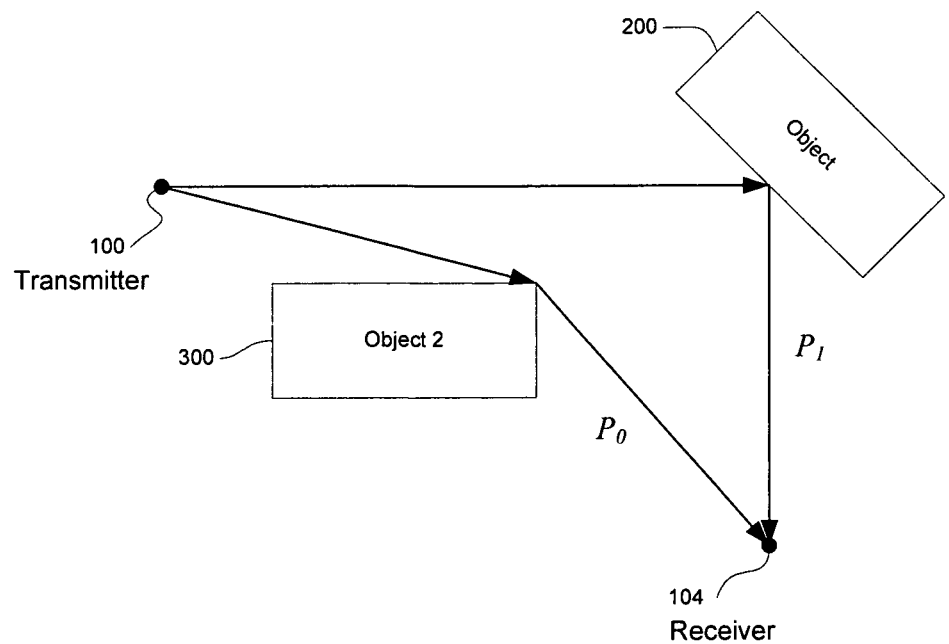
FIG. 3: is an example of a non line-of-sight link.

If a direct line-of-sight path between transmitter 100 and receiver 104 is absent then a link is categorised as NLOS. FIG. 3 shows an example NLOS link. As with the previous example, the transmitted signal arrives at the receiver 104 via two paths. However, in this case path P0 is obstructed by a second object 300 and the signal is diffracted. There is no longer a direct line-of-sight path between transmitter 100 and receiver 104, making this a NLOS link.

Figure 4:
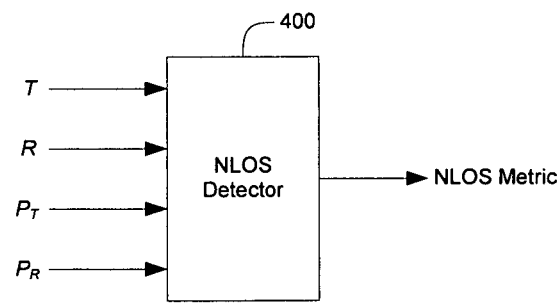
FIG. 4: is a schematic drawing of a non line-of-sight detector.

FIG. 4 shows a block diagram for one arrangement of the non line-of-sight detector 400. Inputs to the NLOS detector 400 are:
T Point in space representing the position of the transmitter;
R Point in space representing the position of the receiver;
PT A measure of transmitted power at the output of the transmit antenna; and
PR A measure of received power at the input to the receive antenna;

The NLOS detector 400 may be collocated with the receiver or transmitter, or at some other location. The NLOS detector 400 may be run online as inputs become available, or in offline mode, post processing input data that was collected prior to its execution.

The transmitter position, T, may be at a fixed location, known at the NLOS detector 400. The transmitter position may also be communicated to the NLOS detector 400, or read from stored data in offline mode. The transmitter 100 may include its position in data transmitted to the receiver, which is then made available to the NLOS detector 400. For example, a DSRC system may include a GPS that determines the position of the transmitter 100. This information may be included in the transmitted data, determined at the receiver 104, and input to the NLOS detector 400.

The receiver position, R, may be at a location known at the NLOS detector 400. For example, a DSRC system may include a GPS that determines the position of the receiver 104. The receiver position may also be communicated to the NLOS detector 400, or read from stored data in offline mode.

The transmitted power, PT, may be at a fixed level known at the NLOS detector 400. The transmitter power may also be communicated to the NLOS detector 400, or read from stored data in offline mode. The transmitter 100 may include the transmit power PT in data transmitted to the receiver, which is then input to the NLOS detector 400. In another embodiment the transmitted data may include transmit power level relative to some stage of the transmitter prior to the transmit antenna input, and/or information regarding system losses and gains, antenna configuration and gain, and other parameters that can be used to calculate PT. In another embodiment, where one or more of the system losses and gains, antenna configuration and gain, and other parameters that can be used to calculate PT are unknown, these may be assigned assumed values.

The received power, PR, may be output from the receiver 104 for input to the NLOS detector 400. In another embodiment the receiver 104 may output receiver power level relative to receiver input or some stage prior to the receiver input. This output may be combined with information regarding system losses and gains, antenna configuration and gain, and other available system parameters, to determine PR. In another embodiment, where one or more of the system losses and gains, antenna configuration and gain, and other parameters that can be used to calculate PR are unknown, these may be assigned assumed values.

Inputs may also be accompanied with statistical information, for example confidence intervals, with such information being employed by the non line-of-sight detector 400 to generate one or more statistics on the output metric.

Figure 5:
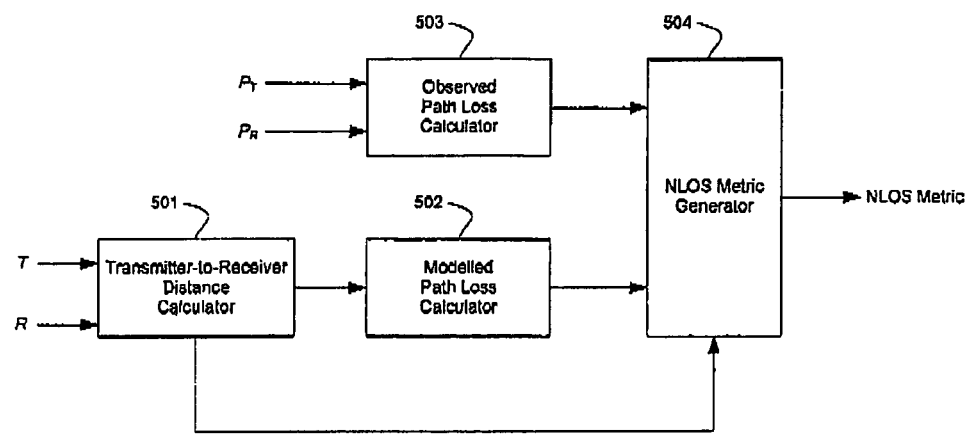
FIG. 5: is a detailed schematic drawing of a non line-of-sight detector.

FIG. 5 shows a block diagram of the NLOS detector 400. The transmitter-to-receiver distance calculator 501 calculates and outputs the distance between the transmitter position T and the receiver position R, as follows:

$$d=\|R-T\|_2$$

where $\|.\|_2$ denotes the L2 Norm:

The observed path loss calculator 503 calculates a measure of the path loss, $L_O$, as follows:

$$L_O = P_T - P_R$$

The modelled path loss calculator 502 calculates the modelled path loss, $L_M$, according to some propagation model. In one arrangement the expected path loss is calculated for a line-of-sight link between transmitter 100 and receiver 104, using the following log-distance free-space path-loss model:

$$L_M = L_{ref} + 10\gamma \log_{10} \frac{d}{d_{ref}}$$

Where:
d is the distance between transmitter and receiver;
$d_{ref}$ is the reference distance (in same units as d);
$L_{ref}$ is the path loss (dBm) at $d_0$;
$P_R$ is the received power in dBm; and
$\gamma$ is the path loss distance exponent;

In another embodiment, the log-distance free space path loss model is replaced with an equivalent linear model. Other embodiments are also possible where the modelled path loss, $L_M$, is calculated using some other path loss model, as will be apparent to those skilled in the art.

In another embodiment, environmental conditions may be known and used by the NLOS metric generator 504. For example the presence of rain, fog or snow may be known, e.g. via one or more sensors collocated with the NLOS metric generator 504, or communicated to the NLOS metric generator 504 as detected by sensors located elsewhere, e.g. collocated with the transmitter 100. In the case when the NLOS metric generator 504 or transmitter 100 is onboard a vehicle the status of the windscreen wipers may be used to detect rain. In this embodiment, the NLOS metric generator 504 may apply a specific propagation model in the case when rain is detected. For example, the NLOS metric generator 504 may use the above model with an adjusted value of path loss exponent, $\gamma$, in the presence of rain, fog, and/or snow.

The NLOS metric generator 504 uses the measured and modelled line-of-sight path losses to generate and output a metric that characterises the link as either LOS or NLOS. In one arrangement the NLOS metric generator 504 calculates the difference between the observed and modelled line-of-sight path losses:

$$\Delta L = L_O - L_M$$

The calculation of $\Delta L$ may be performed in either the log or linear domains.

In one embodiment, the NLOS metric generator 504 outputs a NLOS metric $\lambda = \Delta L$. A small value of $\lambda$ indicates that the model is well matched to the observed channel. When the modelled path loss calculator 502 uses a line-of-sight model, if $\lambda$ is close to zero, or negative, this indicates that the link is more likely to be LOS than NLOS. Conversely, a high positive value of $\lambda$ indicates that the link is more likely to be NLOS than LOS.

In another embodiment the NLOS metric generator 504 maps $\Delta L$ to a metric value prior to output. Such a mapping may be via one of the following:

Input $\Delta L$ mapped onto output value $\lambda$ according to some predetermined function;

Input $\Delta L$ mapped onto a predetermined output value $\lambda$ assigned to that input value;

Inputs $\Delta L$ and transmitter-to-receiver distance d mapped onto output value $\lambda$ according to some predetermined function;

Inputs $\Delta L$ and transmitter-to-receiver distance d mapped onto a predetermined output value $\lambda$ assigned to that combination of input values;

A function that quantizes inputs $\Delta L$ and/or transmitter-to-receiver distance d prior to applying one of the above maps.

In one embodiment the map input space is segmented into n bins labelled $b_1, \ldots, b_n$. Each bin $b_i$ is defined by predetermined lower boundary $b_i^l$ and upper boundary $b_i^u$. Output metric values $\lambda_1, \ldots, \lambda_n$ are assigned to each bin. The NLOS metric generator 504 determines bin membership for input $\Delta L$, such that $b_i^l \leq \Delta L \leq b_i^u$, and then outputs the metric value $\lambda_i$.

In one embodiment, with n=2, the input $\Delta L$ is mapped onto one of two values $\lambda_1$ or $\lambda_2$, and the boundary between $b_1$ and $b_2$ is selected such that it demarcates the expected value of $\Delta L$ as either LOS or NLOS.

In another embodiment, with n=3, the input $\Delta L$ is mapped onto one of three values $\lambda_1, \lambda_2, \lambda_3$. The boundary between $b_1$ and $b_2$ is selected such that it demarcates the expected value of $\Delta L$ as either LOS or unknown. The boundary between $b_2$ and $b_3$ is selected such that it demarcates the expected value of $\Delta L$ as either unknown or NLOS.

In another embodiment, the NLOS metric generator 504 bypasses the measured and modelled path loss calculators if the transmitter-to-receiver distance d is below some threshold value. In one embodiment, during bypass mode the NLOS metric generator 504 outputs a fixed value metric value, e.g. indicating that the link is LOS. In another embodiment, during bypass mode the NLOS metric generator 504 outputs a metric value that is calculated according to some function of the transmitter-to-receiver distance d.

In another embodiment, the NLOS metric generator 504 bypasses the measured and modelled path loss calculators if the transmitter-to-receiver distance d is above some threshold value. In one embodiment, during bypass mode the NLOS metric generator 504 outputs a fixed value metric value, e.g. indicating that the link is NLOS. In another embodiment, during bypass mode the NLOS metric generator 504 outputs a metric value that is calculated according to some function of the transmitter-to-receiver distance d.

In another embodiment the receiver 104 has two or more receive antennas with values $P_R$ per-antenna available, allowing per-antenna calculation of $L_O$. If per-antenna position information is available for receive antennas then d is calculated per-antenna, otherwise d is considered equivalent across receive antennas. In this case, the NLOS metric generator 504 may use metrics calculated from each antenna to output one or more metrics, such as:

Each per-antenna metric value;
The maximum per-antenna metric value;
The minimum per-antenna metric value;
The average per-antenna metric value, taken across all receive antennas;

The average per-antenna metric value, taken across a subset of receive antennas;

Some statistic relating to the per-antenna metric values, e.g. variance;

Some combination of the above.

In another embodiment, the NLOS detector 400 makes an estimate of the power at the output of the transmit antenna, $P_T'$, and uses this to represent the input $P_T$, as follows. When the transmitter-to-receiver distance d is below some value, e.g. 25 m, the expected loss $L_E$ is calculated according to some model. For example, $L_E$ may be calculated from the transmitter-to-receiver distance, as some base loss at a distance with an additional loss per distance decade, e.g. 60 dB at 20 m plus 27 dB per distance decade. The estimate is then calculated according to $P_T'=P_R+L_E$. The NLOS metric generator 504 may record this value for the specific transmitter 100. For further signals received from the same transmitter 100, the wireless link may be characterised as LOS or NLOS using the above methods, assuming power at the output of the transmit antenna equal to $P_T'$.

In another embodiment the NLOS metric generator 504 combines metrics derived from inputs received during some time window. Combination may be performed by filtering metrics over the time window according to some function. Example functions include:

Performing a block average of metrics over the time window;

Performing an auto-regression of metrics over the time window;

Combining a time-based selection of samples from the window.

Information obtained by characterising LOS or NLOS conditions of a wireless link may be processed and provided to recipients, e.g. the driver and/or occupants of a vehicle, and/or used as input to another connected system, such as:

a vehicle system;
a road side system;
a safety system;

For example, the information may be used to:

provide an alert when detecting a potential collision threat;

modify alerts, e.g. by changing the nature of the alert or the alert trigger;

reduce the likelihood of false alerts.

Information obtained by characterising LOS or NLOS of a wireless link between two points in space may also be used to detect and/or correct erroneous map information, or to augment existing map information. These map alterations may also be provided to a central body responsible for reviewing the map data and distributing updates.

The functional modules described herein may be implemented in hardware, for example application-specific integrated circuits (ASICs). Other hardware implementations include, but are not limited to, field-programmable gate arrays (FPGAs), structured ASICs, digital signal processors and discrete logic. Alternatively, the functional modules may be implemented as software, such as one or more application programs executable within a computer system. The software may be stored in a computer-readable medium and be loaded into a computer system from the computer readable medium for execution by the computer system. A computer readable medium having a computer program recorded on it is a computer program product. Examples of such media include, but are not limited to CD-ROMs, hard disk drives, a ROM or integrated circuit. Program code may also be transmitted via computer-readable transmission media, for example a radio transmission channel or a networked connection to another computer or networked device.

It will be understood that the invention disclosed and defined in this specification extends to all alternative combinations of two or more of the individual features mentioned or evident from the text or the drawings. All these different combinations constitute various alternative aspects of the invention.

It will also be understood that the term "comprises" and its grammatical variants as used in this specification is equivalent to the term "includes" and should not be taken as excluding the presence of other elements or features.

The invention claimed is:

1. A computer implemented method for characterising a wireless communications link between a transmitter and a receiver, comprising:

obtaining first data contained in a signal transmitted from the transmitter to the receiver, the first data including a position of the transmitter;

obtaining second data including a position of the receiver;

obtaining a determination of transmitted power at an output of the transmitter;

obtaining a determination of received power at an input to the receiver, the received power being determined based on the signal containing the first data and received at the receiver;

determining a distance between the transmitter and the receiver, using said position of the transmitter and position of the receiver;

determining a modelled path loss based on the distance and a model of path losses;

generating at least one non line-of-sight metric to characterise the wireless link between the transmitter and the receiver based on the modelled path loss, the transmitted power and the received power; and outputting the non line-of-sight metric to characterise the wireless communications link;

wherein at least one of the transmitter and the receiver is mobile.

2. The method as claimed in claim 1 comprising:

determining an observed path loss, using said determination of transmitted power and said determination of received power inputs.

3. The method as claimed in claim 2 wherein said observed path loss is calculated as:

$$L_O = P_T - P_R$$

where:

$L_O$ is the observed path loss;

$P_T$ is a determination of transmitted power at the output of a transmit antenna; and $P_R$ is a determination of received power at the input to a receive antenna.

4. The method as claimed in claim 1 wherein said model of path losses is:

$$L_M = L_{ref} + 10\gamma\log_{10}\frac{d}{d_{ref}}$$

where:

$L_M$ is the modelled path loss;

d is the distance;

$d_{ref}$ is a reference distance (in same units as d);

$L_{ref}$ is the path loss (dBm) at $d_0$; and $\gamma$ is a path loss distance exponent.

5. The method as claimed in claim 1 comprising adjusting a parameter of the model of path losses according to environmental conditions.

6. The method as claimed in claim 5 wherein the path loss distance exponent is adjusted in the presence of at least one of:
rain;
fog; and
snow.

7. The method as claimed in claim 5 comprising detecting said environmental conditions using at least one of:
a sensor collocated with a non line-of-sight metric generator that generates said non line-of-sight metric;
a sensor collocated with the transmitter, an output of the sensor being communicated to the non line-of-sight metric generator;
a status of vehicle windscreen wipers where the non line-of-sight metric generator is mounted onboard a vehicle; and
a status of vehicle windscreen wipers where the transmitter is mounted onboard a vehicle and the status is communicated to the non line-of-sight metric generator.

8. The method as claimed in claim 1 wherein said step of obtaining first data including a position of the transmitter comprises at least one of:
determining a location of the transmitter;
obtaining the first data including the position of the transmitter from a global positioning system (GPS); and
retrieving the position from stored data.

9. The method as claimed in claim 1 wherein said determination of transmitted power input is provided by at least one of:
a fixed level;
a determination relative to some stage of the transmitter prior to a transmit antenna; and
stored data.

10. The method as claimed in claim 1 wherein said determination of received power input is provided by at least one of:
output from the receiver;
a determination relative to receiver input or some stage prior to the receiver input;
stored data.

11. The method as claimed in claim 1 comprising obtaining at least one parameter used to calculate said determination of transmitted power input or said determination of received power input, the parameter comprising at least one of:
information regarding system losses;
information regarding system gains;
antenna configuration; and
antenna gain.

12. The method as claimed in claim 1 comprising calculating a path loss difference between an observed and the modelled path losses as:

$$\Delta L = L_O - L_M$$

where:
$\Delta L$ is the path loss difference;
$L_O$ is the observed path loss; and
$L_M$ is the modelled path loss.

13. The method as claimed in claim 12 comprising mapping said path loss difference to a non line-of-sight metric value prior to output.

14. The method as claimed in claim 13 wherein said mapping comprises at least one of:
said path loss difference mapped onto said non line-of-sight metric according to some predetermined function;
said path loss difference mapped onto a predetermined said non line-of-sight metric assigned to said path loss difference value;
said path loss difference and said transmitter-to-receiver distance mapped onto said non line-of-sight metric according to some predetermined function;
said path loss difference and said transmitter-to-receiver distance mapped onto a predetermined said non line-of-sight metric assigned to that combination of said path loss difference and said transmitter-to-receiver distance;
a function that quantizes said path loss difference; and
a function that quantizes said transmitter-to-receiver distance.

15. The method as claimed in claim 13 wherein said mapping comprises associating said path loss difference to one of a plurality of bins each representing a respective range of path loss differences and assigned a respective NLOS metric value.

16. The method as claimed in claim 15 wherein each said bin is defined by predetermined lower boundary and upper boundary, and said output metric values are assigned to each bin.

17. The method as claimed in claim 15 wherein said bin segmentation comprises at least one of:
two bins, with a boundary between bins selected such that the boundary demarcates the expected value of said path loss difference input as either line-of-sight (LOS) or non line-of-sight; and
three bins, with a boundary between first and second bins selected such that the boundary demarcates the expected value of said path loss difference input as either line-of-sight or unknown, and a boundary between second and third bins selected such that the boundary demarcates the expected value of said path loss difference input as either unknown or non line-of-sight.

18. The method as claimed in claim 1 comprising calculating an observed path loss for each of a plurality of receive antenna.

19. The method as claimed in claim 1 wherein both of the transmitter and the receiver are mobile.

20. The method as claimed in claim 1, wherein said determination of transmitted power input is provided by inclusion in data transmitted to the receiver.

21. A computer implemented method for characterising a wireless communications link between a transmitter and a receiver, comprising:
obtaining data representing a distance between the transmitter and the receiver, the distance being calculated based on at least one of:
first data contained in a signal transmitted from the transmitter and including a position of the transmitter; and
second data obtained from the receiver;
obtaining a determination of transmitted power at an output of the transmitter;
obtaining a determination of received power at an input to the receiver, the received power being determined based on the signal containing the first data and received at the receiver;
determining a modelled path loss based on the distance and a model of path losses;
generating at least one non line-of-sight metric to characterise the wireless link between the transmitter and the receiver based on the modelled path loss, the transmitted power and the received power; and outputting the non line-of-sight metric to characterise the wireless communications link, wherein at least one of the transmitter and the receiver is mobile.

22. A non-transient computer program product comprising machine readable program code recorded on a machine readable recording medium, for controlling the operation of a data processing apparatus on which the program code executes to perform a method for characterising a wireless communications link between a transmitter and a receiver, comprising:

obtaining first data contained in a signal transmitted from the transmitter to the receiver, the first data including a position of the transmitter;

obtaining second data including a position of the receiver;

obtaining a determination of transmitted power at an output of the transmitter;

obtaining a determination of received power at an input to the receiver, the received power being determined based on the signal containing the first data and received at the receiver;

determining a distance between the transmitter and the receiver, using said position of the transmitter and position of the receiver;

determining a modelled path loss based on the distance and a model of path losses;

generating at least one non line-of-sight metric to characterise the wireless link between the transmitter and the receiver based on the modelled path loss, the transmitted power and the received power; and outputting the non line-of-sight metric to characterise the wireless communications link, wherein the transmitter is a mobile transmitter.

23. An apparatus for characterising a wireless communications link between a transmitter and a receiver, comprising:

a first input for obtaining first data contained in a signal transmitted from the transmitter to the receiver, the first data including a position of the transmitter;

a second input for obtaining second data including a position of the receiver;

a third input for obtaining a determination of transmitted power at an output of the transmitter;

a fourth input for obtaining a determination of received power at an input to the receiver, the received power being determined based on the signal containing the first data and received at the receiver;

a detector for:
  determining a distance between the transmitter and the receiver, using said position of the transmitter and position of the receiver;
  determining a modelled path loss based on the distance and a model of path losses;
  generating at least one non line-of-sight metric to characterise the wireless link between the transmitter and the receiver based on the modelled path loss, the transmitted power and the received power; and an output for outputting the non line-of-sight metric to characterise the wireless communications link, wherein the transmitter is a mobile transmitter.

* * * * *